UNITED STATES PATENT OFFICE.

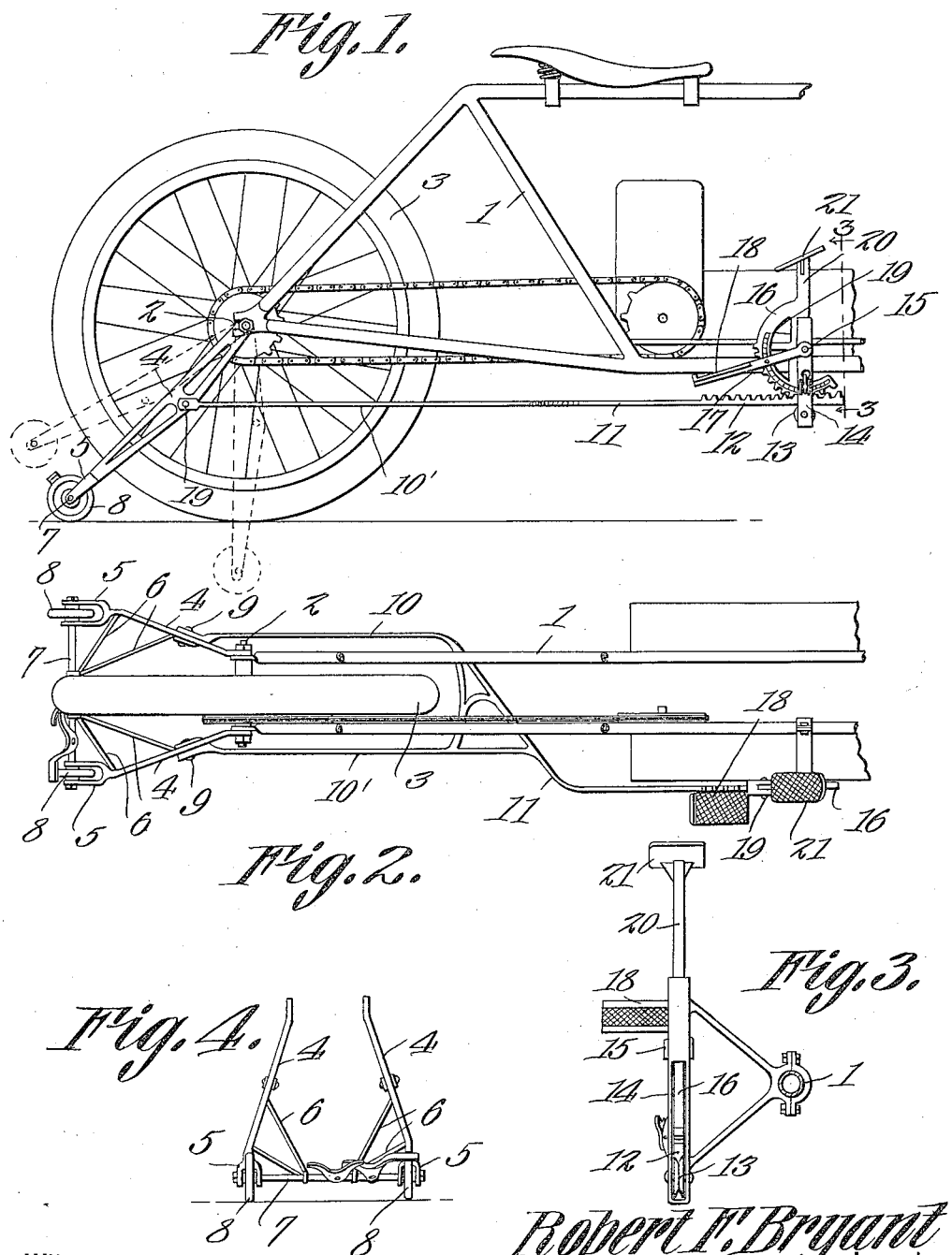

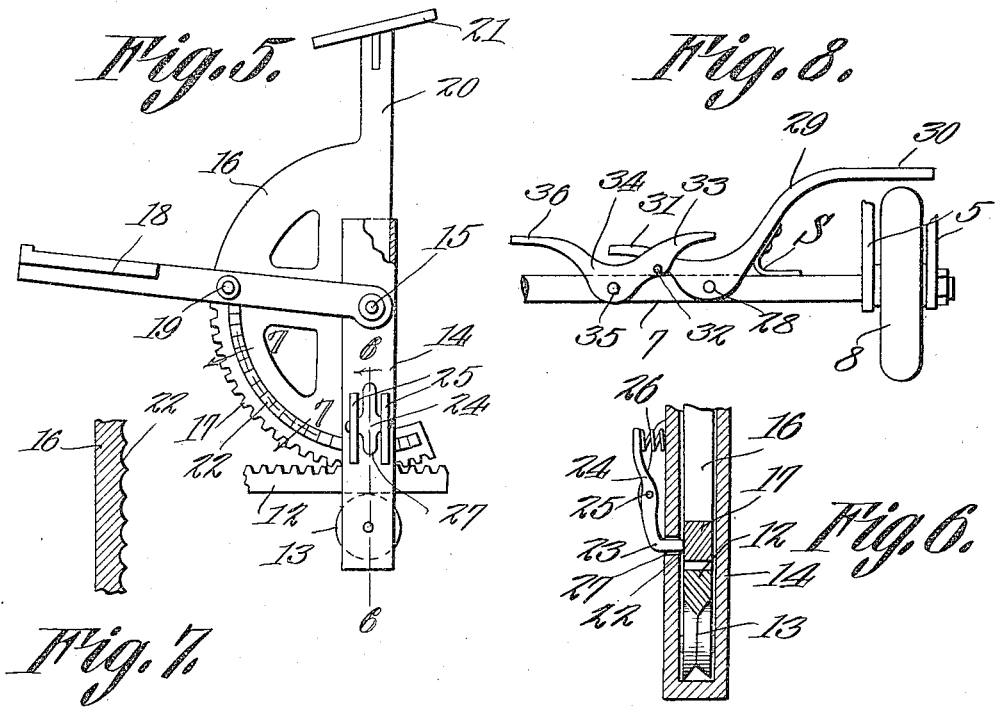

ROBERT FRANCIS BRYANT, OF LOS ANGELES, CALIFORNIA.

BALANCING ATTACHMENT FOR MOTOR-CYCLES.

1,154,089.  Specification of Letters Patent.  Patented Sept. 21, 1915.

Application filed January 29, 1915. Serial No. 5,085.

*To all whom it may concern:*

Be it known that I, ROBERT FRANCIS BRYANT, a citizen of the United States, residing at Los Angeles, in the county of Los Angeles and State of California, have invented a new and useful Balancing Attachment for Motor-Cycles, of which the following is a specification.

The present invention relates to improvements in balancing devices for motor cycles, the same being also applicable for use upon bicycles, one object of the invention, being the provision of a wheel carrying member adapted to be swingingly attached to the hub of the motor cycle or bicycle, for movement to engage the ground as a balancing means or to elevate the rear wheel therefrom, or to be swung rearwardly above the ground, there being provided selective means for actuating the same into the various positions.

A further object of the present invention, is the provision of a device of this character, which is simple, inexpensive and durable in construction, and which by reason of its ready applicability to a motor cycle or bicycle, is thoroughly efficient and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a side elevation of the rear portion of a motor cycle with the present invention applied thereto, dotted lines illustrating the extreme forward and rearward positions of the ground engaging member. Fig. 2 is a top plan view of the same, a portion of the motor cycle frame being broken away to more clearly show the present invention. Fig. 3 is a section taken on line 3—3 of Fig. 1. Fig. 4 is an enlarged detail view of the axle and wheel carrying member of the present device. Fig. 5 is an enlarged detailed side elevation of the fork actuating member showing in detail the two foot pedals for operating the same. Fig. 6 is a section taken on line 6—6 of Fig. 5 on an enlarged scale. Fig. 7 is a section taken on line 7—7 of Fig. 5. Fig. 8 is an enlarged detail view in rear elevation of a portion of the rear axle showing a locking device for one of the wheels thereof to prevent the wheel from rotating.

Referring to the drawings, and more particularly to Figs. 1 through 8, the numeral 1 designates the motor cycle frame, which is provided with the rear axle 2 for carrying the rear or drive wheel 3. Two arms 4 are pivotally attached to the axle 2 to assume the various full and dotted line positions as shown in Fig. 1. Each arm 4 is provided with the fork 5 at its terminal, and carries the two brace members 6 for engagement to support the transverse axle 7. The axle 7 mounted within the forks 5 carries rotatably thereupon the two small wheels 8. It will thus be seen that the wheels 8 may be moved into any of several positions. When the wheels are in the positions indicated by full lines in Fig. 1 they engage the ground to balance the motor cycle and to hold it against tilting. When the wheels are shifted forwardly and downwardly to one of the positions shown by dotted lines in Fig. 1, they elevate the drive wheel 3 above the ground so that the engine may be tested or " tuned " while the motor cycle is at a standstill. When the wheels are in their normal positions, out of contact with the ground, as indicated by dotted lines in Fig. 1, the motor cycle can be propelled without interference by the wheels 8. In this connection, it will be noted that the frame will naturally move to this position due to the forward movement of the motor cycle, thus rendering the present device non-interfering during the running of the motor cycle.

Connected to each arm 4 by means of a pin 9, are the respective members 10 and 10′ of the operating rod 11, both members being connected as illustrated in Fig. 2 so that the rod 11 which is provided with the toothed or racked end 12 may be properly supported for sliding movement above the roller 13 journaled in the supporting frame or yoke 14.

Mounted in the frame 14 is the pin 15, which swingingly attaches the operating segment 16 in place, a portion of the segment being provided with peripheral teeth 17 for engagement with the toothed rack 12, so that the rod 11 may be reciprocated due to the movement of the segment 16. Attached to the pin 15 is the foot treadle or lever 18, which is fixedly connected at 19 to the segment 16.

Formed with the segment 16 and substantially at right angles to the treadle 18, is an arm 20, which provides the foot engaging member 21. Thus in order to move the arm 4 to the full line position or to the extreme forward dotted position, the lever or treadle 18 is depressed, while to move the same in the opposite direction or to the extreme dotted line position, the foot treadle 21 is depressed, thus operating the segment 16 in an opposite direction.

In order to lock the segment 16 in any of the selected positions, and thus hold the wheels 8 in the desired position, there are a plurality of teeth 22 formed upon one side of the segment 16 for coöperation with the pawl 23, which is carried by the pivoted member 24 journaled between the lugs 25 carried by the frame 14, a spring 26 normally holding the same in position to engage the teeth 22 and necessitating the release of the pawl 23 which is projected through the aperture 27 of the frame 14. The teeth 22 will also permit the segment 16 to be operated when the foot of the operator engages either one of the treadles 18 or 21, the spring being of such a strength as to permit this operation without breaking the parts.

In order to lock one of the wheels 8, so that the present device will hold the motor cycle in the proper position, and one of the wheels 8 against revolving, the locking device as particularly shown in detail in Fig. 8 is employed. This includes the member 29, which is pivoted at 28 so that the long arm 30 thereof will be disposed above the tread or tire of the wheel 8, a spring S being connected thereto, to normally hold the same in the position as shown. The opposite end 31 is disposed to engage the pin 32 carried by the terminal 33 of the other pivoted member 34. The member 34 is pivoted at 35 to the axle 7 and is provided with the operating end 36. It will thus be seen that when the operating end 36 of the member 34 is depressed, that the pin 32 will ride under and elevate the end 31 of the member 29 and consequently depress the tire engaging end 30 against the action of the spring S. The pin 32 is disposed at such an angle with relation to its pivot 35 as to lock the end 30 in such depressed position. In order to release the member 29 to its spring S, the end 33 of the member 34 is depressed thus releasing the pin 32 from the end 31 of the member 29 and permitting the spring to elevate the braking end 30.

From the foregoing description, taken in connection with the drawings, it is evident that with a device constructed according to the present invention, that the operator when the parts are shown in the full line position in Fig. 1, may sit astride of the motor cycle, and start the same while the machine is being propelled at a slow rate of speed over the ground and thus the motor cycle will thus be held in an upright position. When having attained full speed, it is merely necessary to operate the member 16 so as to bring the arms to the full rearward dotted position.

What is claimed is:

1. The combination with a bicycle, of a balancing device therefor, including a wheel carrying frame pivotally connected to the hub of the rear wheel of the bicycle, an auxiliary frame connected to the bicycle frame, a pivoted segment carried thereby, means operated by the segment for swinging the wheel carrying frame into or out of contact with the ground, manually controlled means for actuating the segment, teeth upon the segment, and a pawl mounted on the auxiliary frame for engaging the teeth to lock the segment in selected position.

2. The combination with a bicycle, of a frame pivotally connected to the hub of the rear wheel of the bicycle, an auxiliary frame connected to the frame of the bicycle, a segment pivotally mounted upon the auxiliary frame, separate treadle carrying levers connected to the segment and disposed at angles to each other, means operated by the segment for swinging the pivoted frame into or out of engagement with the ground, and coöperating means upon the segment and the auxiliary frame for locking the segment in selected position.

3. The combination with the frame, rear axle and rear wheel of a bicycle, of a balancing device therefor, including a wheeled frame swingingly connected to the hub, a rod connected to the wheeled frame and extending forwardly of the bicycle, an auxiliary frame connected to the bicycle frame, a segment mounted therein for oscillation, coöperative means carried by the segment and the forward end of the rod whereby the rod is reciprocated as the segment is oscillated, manually controlled means for operating the segment, said segment being provided with a plurality of teeth upon one side thereof, and a spring actuated pawl mounted in the auxiliary frame and disposed to engage the teeth to lock the segment in selected position.

4. The combination with the frame, rear axle and rear wheel of a bicycle, of a balancing device therefor, including a wheeled frame swingingly connected to the hub, a rod connected to the frame and extending forwardly of the bicycle, an auxiliary frame connected to the bicycle frame, a segment mounted therein for oscillation, coöperative means carried by the segment and the forward end of the rod whereby the rod is reciprocated as the segment is oscillated, two treadle carrying levers connected to the segment, said levers being at approximate right angles to each other, and coöperative means carried by the segment and the auxiliary frame for locking the segment in selected position.

5. The combination with the frame, rear axle and rear wheel of a bicycle, of a balancing device therefor, including a wheeled frame swingingly connected to the hub, a rod connected to the wheeled frame and extending forwardly of the bicycle, an auxiliary frame connected to the bicycle frame, a segment mounted therein for oscillation, coöperative means carried by the segment and the forward end of the rod whereby the rod is reciprocated as the segment is oscillated, two treadle carrying levers connected to the segment, said levers being at approximate right angles to each other, said segment being provided with a plurality of teeth upon one side thereof, and a spring actuated pawl mounted in the auxiliary frame for engaging the teeth to lock the segment in selected position.

6. The combination with the frame, rear axle and rear wheel of a bicycle, of a balancing device therefor, including an axle carrying frame, the upper terminals of which fit astride the rear wheel and are mounted for swinging movement upon the axle, two wheels carried by the axle of said frame for movement to and from the surface traversed, a rod operably connected to the axle carrying frame and extending forwardly of the bicycle frame, the forward end of said rod being provided with a rack bar, an auxiliary frame through which the rack bar end of the rod is mounted for reciprocation, a toothed segment mounted in the auxiliary frame for oscillation, the teeth thereof being in engagement with the rack bar, and two foot actuated levers connected to the segment at approximate right angles to each other, whereby one lever is operated to move the rack bar and rod forwardly and the other is operated to move it rearwardly.

7. The combination with the frame, rear axle and rear wheel of a bicycle, of a balancing device therefor, including an axle carrying frame the upper terminals of which fit astride the rear wheel and are mounted for swinging movement upon the axle, two wheels carried by the axle of said frame for movement to and from the surface traversed, a rod operably connected to the axle carrying frame and extending forwardly of the bicycle frame, the forward end of said rod being provided with a rack bar, an auxiliary frame through which the rack bar end of the rod is mounted for reciprocation, a toothed segment mounted in the auxiliary frame for oscillation, the teeth thereof being in engagement with the rack bar, and two coöperative pivoted levers connected together and upon the axle of the axle carried frame, one of said levers being provided with a wheel engaging end to form a brake to prevent the rotation of one of the wheels and to lock the bicycle against movement.

In testimony that I claim the foregoing as my own, I have hereto affixed my signature in the presence of two witnesses.

ROBERT FRANCIS BRYANT.

Witnesses:
 ARTHUR P. BRYANT,
 ANDREW TOOLEN.